Oct. 2, 1956                L. E. PURMORT                 2,765,083
                               FILTER
Filed April 26, 1954                              2 Sheets-Sheet 1
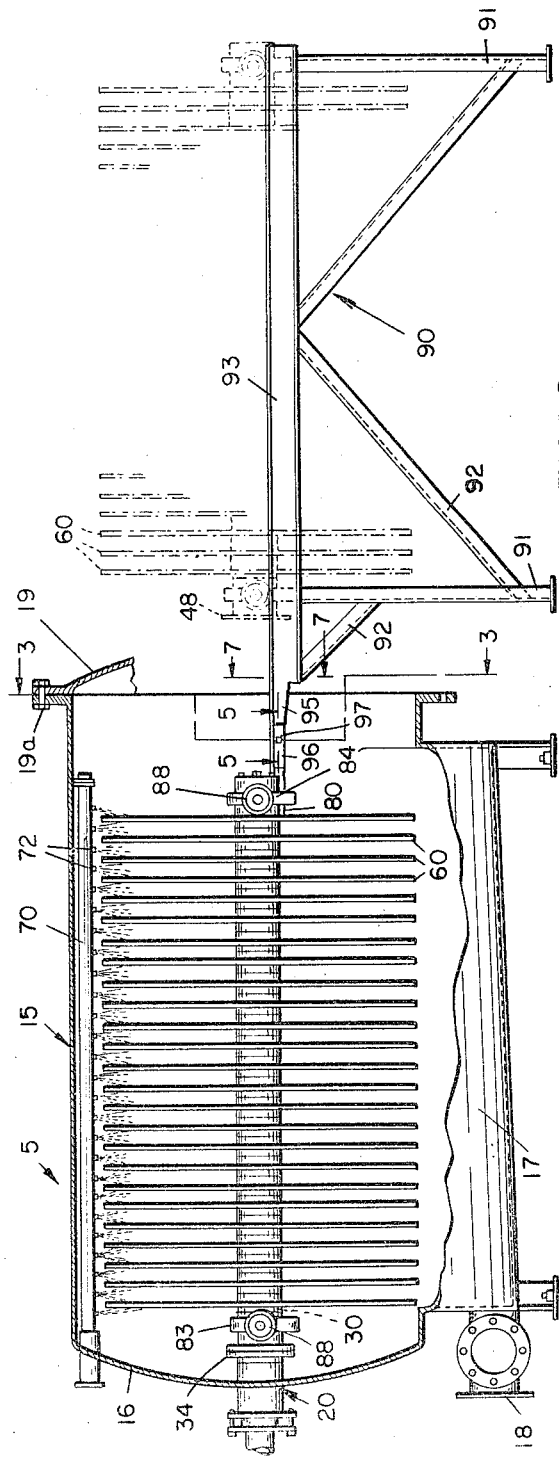
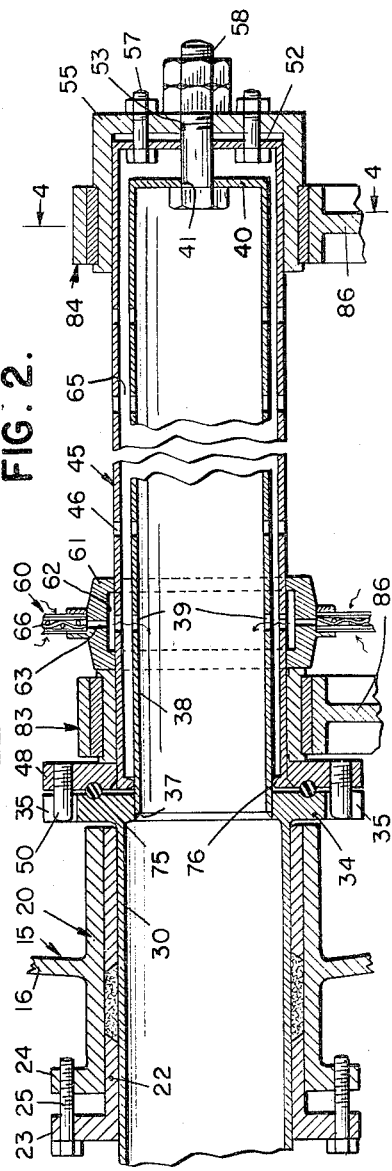
INVENTOR
LOUIS E. PURMORT
BY
Mason & Graham
ATTORNEYS Oct. 2, 1956                L. E. PURMORT                2,765,083
FILTER
Filed April 26, 1954                      2 Sheets-Sheet 2
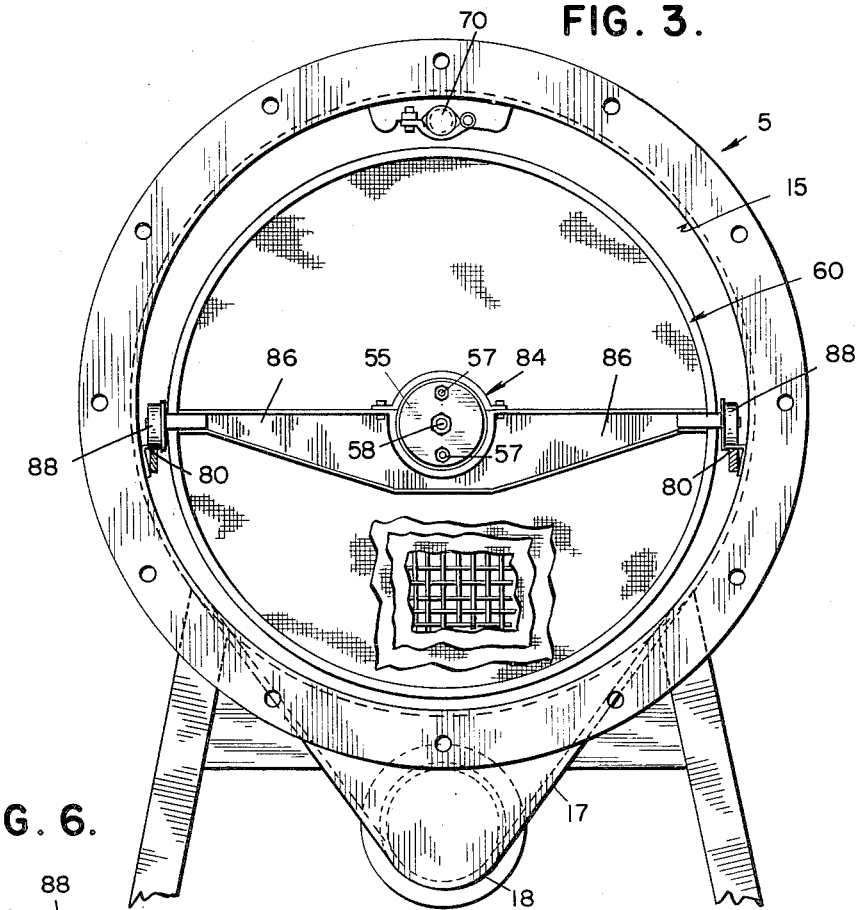
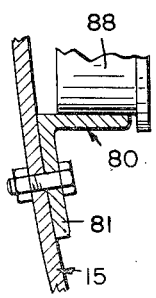
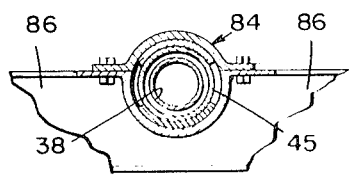
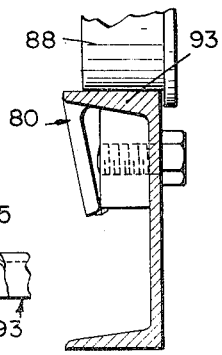
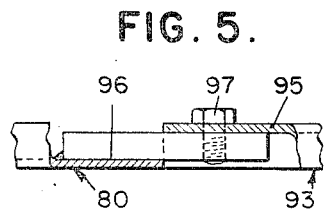
INVENTOR
LOUIS E. PURMORT
BY
*Mason & Graham*
ATTORNEYS United States Patent Office 2,765,083
Patented Oct. 2, 1956

2,765,083

FILTER

Louis E. Purmort, Lynwood, Calif.

Application April 26, 1954, Serial No. 425,352

3 Claims. (Cl. 210—182)

This invention has to do with filters and relates more particularly to improvements in that type of filter wherein a number of filter leaves are mounted upon a tubular shaft within a tank.

In such filters, the liquid to be filtered is introduced into the tank under pressure and is filtered by passing into the filter leaves from which the filtered liquid is discharged through the tubular shaft. While the filter leaves contain suitable screens, their filtering action is enhanced by introducing into the tank, in suspension in the liquid to be filtered, fine particles of such materials as finely divided asbestos colloidal clays or activated carbon, which particles are too large to pass through the screens and thus become deposited on the outside of the screens to function as filter media. It thus becomes necessary to remove this filtering media from the screens and also it frequently becomes necessary to remove and replace or repair the filter leaves. Inasmuch as the shaft passes axially through the filter leaves, their removal for repair or replacement has been a time consuming and cumbersome operation since, conventionally, the shaft must be removed, requiring dismantling of the assembly. Also, when it becomes necessary to remove the filter leaves from the tank for hand cleaning, the procedure has also been time consuming and cumbersome. It is to the overcoming of those difficulties that my present invention is principally directed.

It is, therefore, an object of my invention to provide a filter of the type described wherein the filter leaves and their mounting shaft are so mounted and supported in the tank that they may be readily removed axially from the tank.

Another and more specific object of my invention is to provide an improved filter of this type in which the filter leaves are mounted upon the outer one of a pair of telescopically associated shafts to facilitate moving the outer one of the shafts, with its carried filter leaves, axially from the tank.

Other objects and accomplishments of my invention will appear hereinafter.

For the purpose of enabling those skilled in the art to understand and practice my invention, I shall now describe it in one of its presently preferred embodiments for which purpose I shall refer to the accompanying drawings wherein:

Fig. 1 is a longitudinal medial section;

Fig. 2 is an enlarged fragmentary section showing the shaft area;

Fig. 3 is a view taken on line 3—3 of Fig. 1;

Fig. 4 is a reduced section taken on line 4—4 of Fig. 2;

Fig. 5 is an enlarged section taken on line 5—5 of Fig. 1;

Fig. 6 is an enlarged section of the track area; and

Fig. 7 is an enlarged section taken on line 7—7 of Fig. 1.

It will be understood, of course, that various modifications may be made within the purview of the broader aspects of my invention as defined by the appended claims.

With particular reference to the drawings, the numeral 5 generally denotes a filter device incorporating my invention. 15 denotes a tank which generally is of cylindrical cross section except that the bottom 17 is of somewhat "U" cross section to facilitate discharge of the filtering media removed from the filter leaves, the discharge finally taking place through an end outlet 18. It is my preference that the side walls of the portion 17 intersect the side walls of the main tank portion tangentially. The tank, of course, has a conventional valve controlled inlet, not shown, through which the liquid to be filtered is introduced into the tank, and has an inner end wall 16 and a removable outer end wall 19 secured as by bolts 19a.

Extending through an axial opening in the inner end wall 16 of the tank, there is a bearing 20 having a bushing 22. The bushing and bearing have outer end flanges 23, 24, secured together by bolts 25.

A tubular shaft member 30 is journaled in the bearing at 20, the member 30 having a peripheral flange 34 on its inner or righthand end, presenting circumferentially spaced peripheral notches 35. Also, the inner end of member 30 is of relatively reduced internal diameter, an inner shaft extension 38 being fixed in the inner end of member 30 as by welding 37, the shaft extension 38 being tubular and having perforations 39 in its side wall and having an outer end closure wall 40 presenting an axial opening 41 therethrough.

An outer tubular shaft 45 having perforations 46 is telescopically mounted concentrically on shaft 38 and has a peripheral end flange 48 carrying end projections 50 engageable in the slots 35 to lock shaft 45 to member 30 in a way to permit shaft 45 to be moved axially to the right relative to member 30, but relative rotation is prevented.

Shaft portion 45 is also closed at its outer end by an end wall 52 having an axial opening 53 registering with opening 41. A shaft cap 55 is secured on the outer end of shaft portion 45 by bolts 57 and 58, the latter bolt extending through openings 41 and 53 to hold the outer end shaft portions 38 and 45 concentric as well as to hold such shaft portions against relative axial movement.

A plurality of filter leaves generally denoted 60 are mounted on hubs 61 mounted in juxtaposition on shaft portion 45. Each of the hubs 61 has an annular inner channel 62 and radial inlet ports 63, the channel communicating with perforations 46. The filtered liquid entering through ports 63, channels 62 and perforations 46 passes through an inlet chamber 65 between shaft portions 38 and 45, and thence passes into the shaft portion 38 through perforations 39, and thence passes out axially of the shaft.

Shaft 30 may be rotatably driven by power means, not shown, disposed exteriorly of the tank.

For cleaning the screens of the filter leaves 60 between filtering operations, I provide a header 70 mounted longitudinally of the interior of the tank adjacent the side wall of the tank, the header having spray jets 72 disposed to spray a cleaning liquid onto the filter leaves.

Seal rings 75, 76, prevent leakage from chamber 65 into the tank.

For the purpose of facilitating repair or replacement of the filter leaves and also to facilitate hand cleaning when that may be necessary, I provide a novel mounting of the inner or right end of the shaft portion. This mounting comprises a pair of tracks 80 disposed longitudinally of the tank interior and each having an attaching flange 81 bolted to the side wall of the tank.

The shaft 45 and cap 55 are journaled in bearings 83, 84, respectively, each of which bearings has lateral arms 86 secured thereto. Each of the arms 86 carries a roller 88 at its outer end, which roller engages a track 80.

From the foregoing, it will be apparent that the shaft portion 45, which carries the filter leaves and supporting hubs, may be telescopically removed axially from the tank by removing the nuts from bolt 58 and then pulling outwardly on the cap 55, which causes the shaft portion 45 to be moved axially outwardly as the rollers 88 move along the tracks. Inasmuch as when the shaft 45 is in its outer position, the projections 50 are removed from slots 35, the shaft portion 45 may be freely rotated to facilitate repair or removal of the filter leaves.

In order to support the shaft portion 45 and its carried filter leaves after they are removed axially from the tank in the manner prescribed, I may provide a supporting table 90 (Fig. 1). Table 90 has legs 91 and braces 92, which support parallel tracks 93 in alignment with tracks 80. Each track 93 has an inner end extension 95 disposed to be connected to the outer end 96 of each track 80 as by a bolt 97. In the broken line portion of Fig. 1, the shaft portion 45 and its carried filter leaves are shown moved outwardly of the tank and onto the table 90. After the desired repair or replacement of filter leaves has been completed, the user merely pushes the shaft portion 45 axially back into the tank, wherein it telescopes onto shaft portion 38 and the projections 50 again become locked in slots 35 so that when the shaft 30 is rotatably driven, the shaft portions 30, 38 and 45 rotate as a unit.

I claim:

1. A filter device comprising in combination with a tank for the reception of liquid to be filtered, said tank having a tubular outlet member extending through and rotatably disposed in one of its ends and having a removable end wall at its other end, a tubular perforated inner shaft extending axially into said tank and forming a coaxial extension of said outlet member, said shaft having a closed end adjacent the removable end wall of said tank, a tubular perforated outer shaft telescopically mounted on said inner shaft and having a closed end adjacent the removable end wall of said tank, filter members carried by said outer shaft in communication with the perforations thereon, means for releasably locking the said outer shaft to said outlet member, said shafts being radially spaced whereby to provide a fluid-receiving chamber therebetween in communication with said perforations in said inner shaft, and means for rotatably and longitudinally movably supporting the closed end of said outer shaft, said latter means comprising bearing members journaling said outer shaft, arms projecting laterally from said bearing members and rollers on the outer end of said arms and longitudinal track members secured to the inner surface of said tank in position to be engaged by said rollers.

2. A filter device as set forth in claim 1 in which said filter members are axially individually removably mounted on said outer shaft.

3. A filter device as set forth in claim 1 in which said outer shaft is detachably secured to said inner shaft at the closed ends of the shafts and in which inter-engaging means is provided on the other end of said outer shaft and on said outlet member for preventing rotation of said outer shaft relative to said outlet member.

References Cited in the file of this patent

UNITED STATES PATENTS

| 477,238 | Winterros | June 21, 1892 |
| 1,212,932 | Genter | Jan. 16, 1917 |
| 2,050,007 | Keith et al. | Aug. 4, 1936 |
| 2,593,707 | Walker | Apr. 22, 1952 |

FOREIGN PATENTS

| 290,425 | Germany | Feb. 26, 1916 |
| 580,230 | France | Nov. 3, 1924 |
| 656,554 | Great Britain | Aug. 29, 1951 |
| 780,398 | France | Apr. 25, 1935 |